US012755666B2

(12) United States Patent
Hayden et al.

(10) Patent No.: US 12,755,666 B2
(45) Date of Patent: Oct. 6, 2026

(54) DYNAMIC EDGE ENHANCEMENT IN VIDEO

(71) Applicant: VISTEON GLOBAL TECHNOLOGIES, INC., Van Buren Township, MI (US)

(72) Inventors: Brian John Hayden, Royal Oak, MI (US); Ucheol Lee, Ypsilanti, MI (US); Paul Fredrick Luther Weindorf, Novi, MI (US); Danail Krasimirov Totev, Sofia (BG)

(73) Assignee: VISTEON GLOBAL TECHNOLOGIES, INC., Van Buren Township, MI (US)

( * ) Notice: Subject to any disclaimer, the term of this patent is extended or adjusted under 35 U.S.C. 154(b) by 114 days.

(21) Appl. No.: 18/960,656

(22) Filed: Nov. 26, 2024

(65) Prior Publication Data

US 2025/0174168 A1 May 29, 2025

Related U.S. Application Data

(60) Provisional application No. 63/604,187, filed on Nov. 29, 2023.

(51) Int. Cl.

*G09G 3/20* (2006.01)
*G06T 5/40* (2006.01)

(Continued)

(52) U.S. Cl.

CPC ............. *G09G 3/2007* (2013.01); *G06T 5/40* (2013.01); *G06T 5/73* (2024.01); *G06T 5/94* (2024.01);

(Continued)

(58) Field of Classification Search

None

See application file for complete search history.

(56) References Cited

U.S. PATENT DOCUMENTS 9,299,164 B2 * 3/2016 Lin ........................... G06T 5/73
2012/0002105 A1 * 1/2012 Hirayama .............. H04N 7/014 348/E7.003

(Continued)

OTHER PUBLICATIONS

Su, Haonan et al., "Readability Enhancement of Displayed Images Under Ambient Light," Xidian Media Lab, 2015, pp. 1-4.

(Continued)

*Primary Examiner* — Saptarshi Mazumder

(74) *Attorney, Agent, or Firm* — Quinn IP Law

(57) ABSTRACT

A dynamic edge enhancement system includes a light sensor, a circuit, and a microcontroller. The light sensor is operational to generate a light background signal by measuring an ambient light falling on a display. The circuit is operational to generate a histogram of gray shade values in multiple frames of an input video signal received by the circuit, detect multiple edges in the input video signal, enhance the multiple edges in response to a gray shade transfer table and an edge mask strength value, and generate an output video signal suitable to drive the display after the enhancement of the edges. The microcontroller is operational to generate the gray shade transfer table based on the histogram generated by the circuit, and generate the edge mask strength value in response to the gray shade transfer table, the light background signal, a night luminance threshold value, and a day luminance threshold value.

20 Claims, 6 Drawing Sheets

(51) Int. Cl.

| | |
|---|---|
| ***G06T 5/73*** | (2024.01) |
| ***G06T 5/94*** | (2024.01) |
| *B60K 35/22* | (2024.01) |
| *B60K 35/81* | (2024.01) |

(52) U.S. Cl.

CPC .............. *B60K 35/22* (2024.01); *B60K 35/81* (2024.01); *G06T 2207/20192* (2013.01); *G09G 2320/0242* (2013.01); *G09G 2320/0686* (2013.01); *G09G 2330/023* (2013.01); *G09G 2360/144* (2013.01); *G09G 2380/10* (2013.01)

(56) References Cited

U.S. PATENT DOCUMENTS

| | | | | |
|---|---|---|---|---|
| 2012/0162245 | A1 | 6/2012 | Kerofsky et al. | |
| 2016/0155413 | A1* | 6/2016 | Yeom ................. | H04N 21/4318<br>345/589 |
| 2019/0147570 | A1* | 5/2019 | Lin ........................... | G06T 5/73<br>382/266 |
| 2021/0272251 | A1 | 9/2021 | Unger et al. | |
| 2025/0157015 | A1* | 5/2025 | Chen ......................... | G06T 7/11 |

OTHER PUBLICATIONS

Bauer, Jan et al., "Understanding the Requirements for Automotive Displays in Ambient Light Conditions," Information Display, 2016, pp. 14-22.

* cited by examiner

DYNAMIC EDGE ENHANCEMENT IN VIDEO

CROSS-REFERENCE TO RELATED APPLICATIONS

This application claims the benefit of U.S. Provisional Application No. 63/604,187 filed Nov. 29, 2023, which is hereby incorporated by reference in its entirety.

TECHNICAL FIELD

The present disclosure generally relates to systems and methods for dynamic edge enhancement in video.

BACKGROUND

In automotive display applications, light sensors have been utilized to automatically control the display luminance as a function of the ambient lighting environment. As the ambient environment increases, the display luminance increases to maintain visibility of the images. Edge enhancements are used to keep symbols on the display sharp to an observer. Automatic luminance control methods maintain a comfortable level of viewing brightness, and reduce a display power consumption as the ambient illumination decreases. Although automatic luminance control methods maintain visibility of the symbols for peak-white gray shades, the visibility of lower gray shades may be compromised. Issues sometimes arise with fixed edge enhancements in low ambient light conditions.

SUMMARY

A dynamic edge enhancement system is provided herein. The dynamic edge enhancement system includes a light sensor, a circuit, and a microcontroller. The light sensor is operational to generate a light background signal by measuring an ambient light falling on a display. The circuit is operational to generate a histogram of gray shade values in a plurality of frames of an input video signal received by the circuit, detect a plurality of edges in the input video signal, enhance the plurality of edges in response to a gray shade transfer table and an edge mask strength value, and generate an output video signal suitable to drive the display after the enhancement of the plurality of edges. The microcontroller is operational to generate the gray shade transfer table based on the histogram generated by the circuit, and generate the edge mask strength value in response to the gray shade transfer table, the light background signal, a night luminance threshold value, and a day luminance threshold value.

In one or more embodiments of the dynamic edge enhancement system, the enhancement of the plurality of edges by the circuit extinguishes the plurality of edges in response to receiving a no-mask value of the edge mask strength value.

In one or more embodiments of the dynamic edge enhancement system, the microcontroller is further operational to set the edge mask strength value to the no-mask value in response to the light background signal being dimmer than the night luminance threshold value.

In one or more embodiments of the dynamic edge enhancement system, the enhancement of the plurality of edges by the circuit darkens the plurality of edges in response to receiving a full-mask value of the edge mask strength value.

In one or more embodiments of the dynamic edge enhancement system, the microcontroller is further operational to set the edge mask strength value to the full-mask value in response to the light background signal being brighter than the day luminance threshold value.

In one or more embodiments of the dynamic edge enhancement system, the plurality of edges that are extinguished in response to the no-mask value approximately match a local background color in the input video signal, the plurality of edges that are darkened in response to the full-mask value approximately match a zero-value version of the local background color in a Munsell color system, and the plurality of edges are adjusted to a value level between the local background color and the zero-value version of the local background color where the edge mask strength value is between the no-mask value and the full-mask value.

In one or more embodiments of the dynamic edge enhancement system, a negative slope of a transfer function curve of the edge mask strength value as the light background signal varies between the night luminance threshold value and the day luminance threshold value is reduced as the transfer function curve approaches the day luminance threshold value.

In one or more embodiments of the dynamic edge enhancement system, the plurality of edges are detected where a contrast ratio is greater than an edge threshold value.

In one or more embodiments of the dynamic edge enhancement system, the display forms part of a vehicle.

A method for dynamic edge enhancement is provided herein. The method includes generating a light background signal by measuring an ambient light falling on a display with a light sensor, generating a histogram of gray shade values in a plurality of frames of an input video signal received at a circuit, generating a gray shade transfer table based on the histogram, generating an edge mask strength value with a microcontroller in response to the gray shade transfer table, the light background signal, a night luminance threshold value, and a day luminance threshold value, detecting a plurality of edges in the input video signal, enhancing the plurality of edges in the input video signal in response to the gray shade transfer table and the edge mask strength value, and generating an output video signal suitable to drive the display after the enhancement of the plurality of edges.

In one or more embodiments of the method, the enhancing of the plurality of edges extinguishes the plurality of edges in response to receiving a no-mask value of the edge mask strength value.

In one or more embodiments, the method includes setting the edge mask strength value to the no-mask value in response to the light background signal being dimmer than the night luminance threshold value.

In one or more embodiments of the method, the enhancing of the plurality of edges darkens the plurality of edges in response to receiving a full-mask value of the edge mask strength value.

In one or more embodiments, the method includes setting the edge mask strength value to the full-mask value in response to the light background signal being brighter than the day luminance threshold value.

In one or more embodiments of the method, the plurality of edges that are extinguished in response to the no-mask value approximately match a local background color in the input video signal, the plurality of edges that are darkened in response to the full-mask value approximately match a zero-value version of the local background color in a Munsell color system, and the plurality of edges are adjusted to a value level between the local background color and the zero-value version of the local background color where the edge mask strength value is between the no-mask value and the full-mask value.

In one or more embodiments of the method, a negative slope of a transfer function curve of the edge mask strength value as the light background signal varies between the night luminance threshold value and the day luminance threshold value is reduced as the transfer function curve approaches the day luminance threshold value.

In one or more embodiments of the method, the plurality of edges are detected where a contrast ratio is greater than an edge threshold value.

In one or more embodiments of the method, the enhancing of the plurality of edges in the input video signal is performed in a vehicle.

A vehicle is provided herein. The vehicle includes a display, a light sensor, and an electronic control unit. The light sensor is operational to generate a light background signal by measuring an ambient light falling on the display. The electronic control unit is operational to generate a histogram of gray shade values in a plurality of frames of an input video signal received by the electronic control unit, generate a gray shade transfer table based on the histogram, generate an edge mask strength value in response to the gray shade transfer table, the light background signal, a night luminance threshold value, and a day luminance threshold value, detect a plurality of edges in the input video signal, enhance the plurality of edges in response to the gray shade transfer table and the edge mask strength value, and generate an output video signal used to drive the display after the enhancement of the plurality of edges.

In one or more embodiments of the vehicle, the plurality of edges that are extinguished in response to a no-mask value of the edge mask strength value approximately match a local background color in the input video signal, the plurality of edges that are darkened in response to a full-mask value of the edge mask strength value approximately match a zero-value version of the local background color in a Munsell color system, and the plurality of edges are adjusted to a value level between the local background color and the zero-value version of the local background color where the edge mask strength value is between the no-mask value and the full-mask value.

The above features and advantages and other features and advantages of the present teachings are readily apparent from the following detailed description of the best modes for carrying out the teachings when taken in connection with the accompanying drawings.

Figure 1:
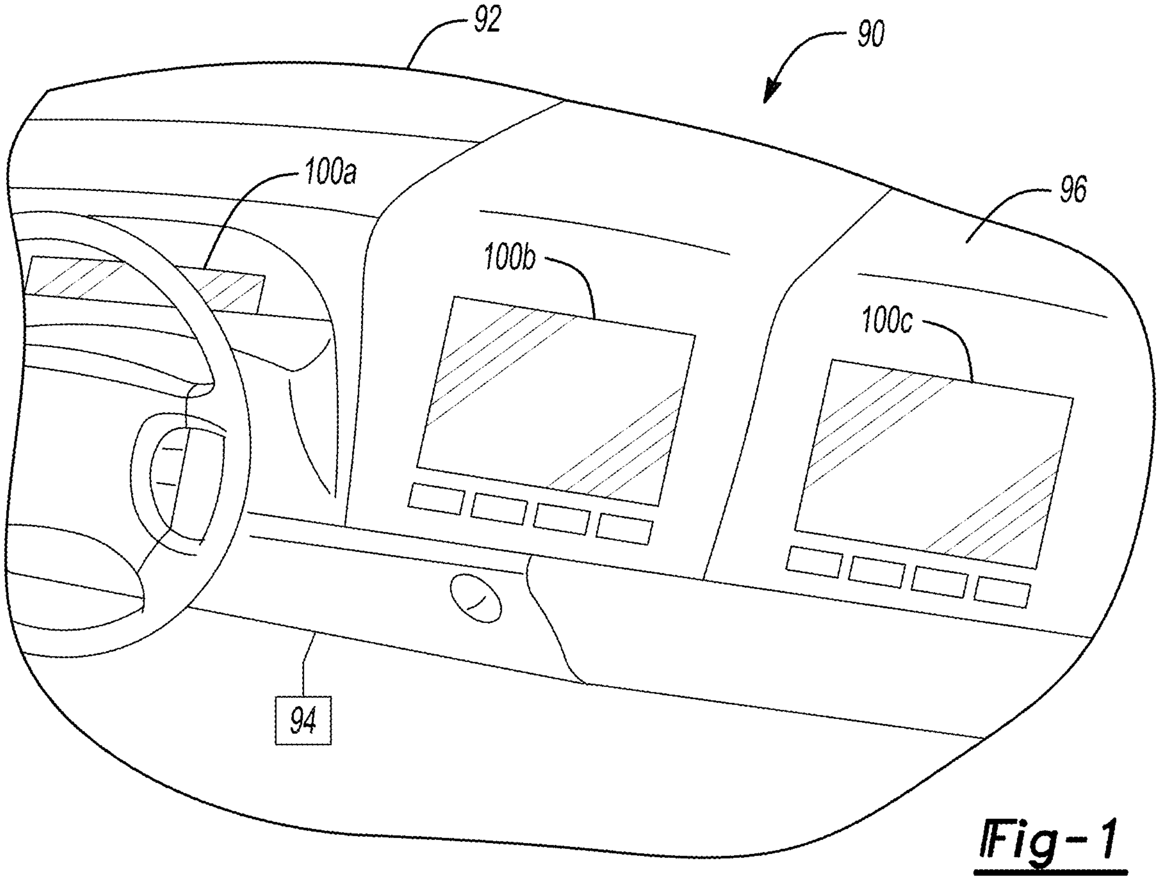
FIG. 1 illustrates a context of a vehicle.

The present disclosure may have various modifications and alternative forms, and some representative embodiments are shown by way of example in the drawings and will be described in detail herein. Novel aspects of this disclosure are not limited to the particular forms illustrated in the above-enumerated drawings. Rather, the disclosure is to cover modifications, equivalents, and combinations falling within the scope of the disclosure as encompassed by the appended claims.

DETAILED DESCRIPTION

Embodiments of the disclosure generally provide dynamic edge enhancements that place one or a few dark pixels around symbols that exceed a predetermined contrast ratio threshold (e.g., an edge threshold value >5) in an input video signal. By examining the input video signal, rather than an image enhanced output video signal, the symbols in the input video signal may be intelligently constructed to have high contrast ratios to maintain visibility. The dynamic edge enhancements generally adjust the dark pixel base on background light luminance levels. For brighter background light, the edge pixels are darkened. For lighter background light the edge pixels are made more transparent. For intermediate background light, the edge pixels are adjusted to intermediate levels.

FIG. 1 illustrates a context of a vehicle 90. The vehicle 90 generally includes a body 92, an electronic control unit 94, and an instrument panel 96 having one or more displays 100*a*-100*c*. The body 92 may implement an interior body of the vehicle 90. The vehicle 90 may include mobile vehicles such as automobiles, trucks, motorcycles, boats, trains and/or aircraft. In some embodiments, the body 92 may be part of a stationary object. The stationary objects may include, but are not limited to, billboards, kiosks and/or marquees. Other types of vehicles 90 may be implemented to meet the design criteria of a particular application.

The electronic control unit 94 may implement one or more display-driver circuits. The electronic control unit 94 is generally operational to generate control signals that drive the displays 100*a*-100*c*. In various embodiments, the control signals may be configured to provide instrumentation (e.g., speed, tachometer, fuel, temperature, etc.) to at least one of the displays 100*a*-100*c* (e.g., 100*a*). In some embodiments, the control signals may also be configured to provide video (e.g., a rear-view camera video, a forward-view camera video, an onboard DVD player, etc.) to the displays 100*a*-100*c*. In other embodiments, the control signals may be further configured to provide alphanumeric information shown on one or more of the displays 100*a*-100*c*.

In various embodiments, the electronic control unit 94 generally comprises at least one microcontroller. The at least one microcontroller may include one or more processors, each of which may be embodied as a separate processor, an application specific integrated circuit (ASIC), a field programmable gate array (FPGA), or a dedicated electronic control unit. The at least one microcontroller may be any sort of electronic processor (implemented in hardware, software executing on hardware, or a combination of both). The at least one microcontroller may also include tangible, nontransitory memory, (e.g., read-only memory in the form of optical, magnetic, and/or flash memory). For example, the at least one microcontroller may include application-suitable amounts of random-access memory, read-only memory, flash memory and other types of electrically-erasable programmable read-only memory, as well as accompanying hardware in the form of a high-speed clock or timer, analog-to-digital and digital-to-analog circuitry, and input/output circuitry and devices, as well as appropriate signal conditioning and buffer circuitry.

Computer-readable and executable instructions embodying the present method may be stored in the memory and executed as set forth herein. The executable instructions may be a series of instructions employed to run applications on the at least one microcontroller (either in the foreground or background). The at least one microcontroller may receive commands and information, in the form of one or more input signals from various controls or components in the vehicle 90 and communicate instructions to the displays 100*a*-100*c* through one or more control signals to control the displays 100*a*-100*c*.

The instrument panel 96 implements a structure (or instrument cluster) that supports the displays 100*a*-100*c*. As illustrated, the display 100*a* may be a cluster display positioned for use by a driver. The display 100*b* may be a console display positioned for use by the driver and a passenger. The display 100*c* may be a passenger display positioned for use by the passenger.

The displays 100*a*-100*c* are generally mounted to the instrument panel 96. In various embodiments, one or more of the displays 100*a*-100*c* may be disposed inside the vehicle 90. In other embodiments, one or more of the displays 100*a*-100*c* may be disposed on an exterior of the vehicle 90. One or more of the displays 100*a*-100*c* may implement an enhanced vehicle display that is visible to a driver under a variety of lighting conditions. Control signals used to generate images on the displays 100*a*-100*c* may be received as electrical communications from the electronic control unit 94.

Figure 2:
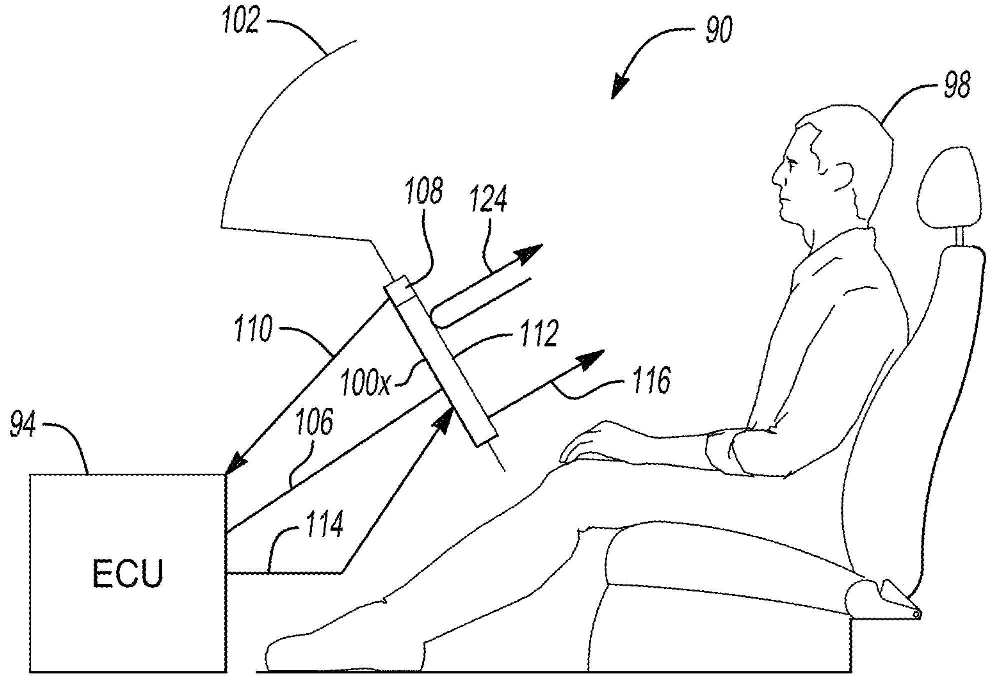
FIG. 2 illustrates a side view schematic diagram of a driver relative to a display in accordance with one or more exemplary embodiments.

FIG. 2 illustrates a side view schematic diagram of an example driver 98 relative to a display 100*x* in accordance with one or more exemplary embodiments. The display 100*x* may be representative of the displays 100*a*-100*c* (e.g., 100*a*). The driver 98 is shown sitting in a driver's seat of the vehicle 90 behind the display 100*a*. In other embodiments, the driver 98 may be a passenger sitting in another seat and/or located behind another display 100*b* and/or 100*c*. The display 100*x* generally has a face (or front surface) 112 that can be seen by the driver 98. The vehicle 90 includes the electronic control unit 94, a windshield 102, and an ambient light sensor 108.

An ambient light 124 within the vehicle may reflect from the display 100*x* and be directed to the driver 98. The ambient light 124 may arise from reflections of the light from the sun, other lights around the vehicle 90 (e.g., streetlights), lights within the vehicle 90 (e.g., dome lights), other vehicle headlights, and the like. While the driver 98 is looking down at the front surface 112 of the display 100*x* and/or at the instrument panel 96, the driver 98 sees the reflected ambient light 124 superimposed on graphics images 116 being generated by the display 100*x*.

The electronic control unit 94 is in electrical communication with the ambient light sensor 108, and the display 100*x*. The electronic control unit 94 receives an ambient luminance value from the ambient light sensor 108 in a light background signal 110. The ambient luminance value is proportional to an intensity of the reflected ambient light 124 sensed by the ambient light sensor 108.

The electronic control unit 94 is operational to use the ambient luminance value to dynamically adjust a display brightness of the display 100*x* via a display luminance control value 114. Under bright conditions while the pupils of the driver 98 are narrow, the electronic control unit 94 increases the overall brightness of the display 100*x* (e.g., increases a projection light source within the display) to prevent images on the display 100*x* from being washed out. Therefore, the driver 98 may comfortably view the brightened images on the display 100*x*. Under dark conditions while the pupils of the driver 98 are wide, the electronic control unit 94 decreases the overall brightness of the display 100*x* (e.g., decreases the projection light source) to keep the images on the display 100*x* from becoming a distraction. Lowering the brightness of the display 100*x* also helps reduce an electrical power consumption of the display 100*x*.

The electronic control unit 94 is further operational to use the ambient luminance value in the light background signal 110 to dynamically adjust edge enhancements of an output video signal 106 being transferred to the display 100*x*. While the ambient luminance value is low, the electronic control unit 94 adjusts (e.g., extinguishes) the edge enhancements visible in the graphics images 116. The extinguishing generally adjusts a value level (as viewed in a Munsell color system) of the edges to match a local background color in the input video signal. In effect, the edges may be considered transparent. For example, where the local background color is blue, the edges will be adjusted to the same or similar blue. In effect, the driver 98 does not see black borders outlining the symbols (e.g., letter, numbers, graphic characters, symbology, and the like) in the graphics images 116. While a low reflected ambient light 124 is present, the symbols in the graphics image 116 may be clear to the driver 98.

While the ambient luminance value is high, the reflected ambient light 124 reduces the contrast ratios of what the driver 98 sees and thus obscures the symbols with the background in the graphics image 116. Therefore, the electronic control unit 94 darkens the value level of the edges to approximately match a zero-value version of the local background color in the graphics image 116. In effect, the edges may become almost black. The darker edges generally sharpen and make the symbols more visible relative to the background as seen by the driver 98.

While the ambient luminance value is at intermediate levels between low and high, the reflected ambient light 124 is likewise at intermediate levels. As such, the electronic control unit 94 adjusts the value level of the edges to intermediate levels between almost black and transparent.

Figures 3A, 3B, 3C, 3D, 3E:
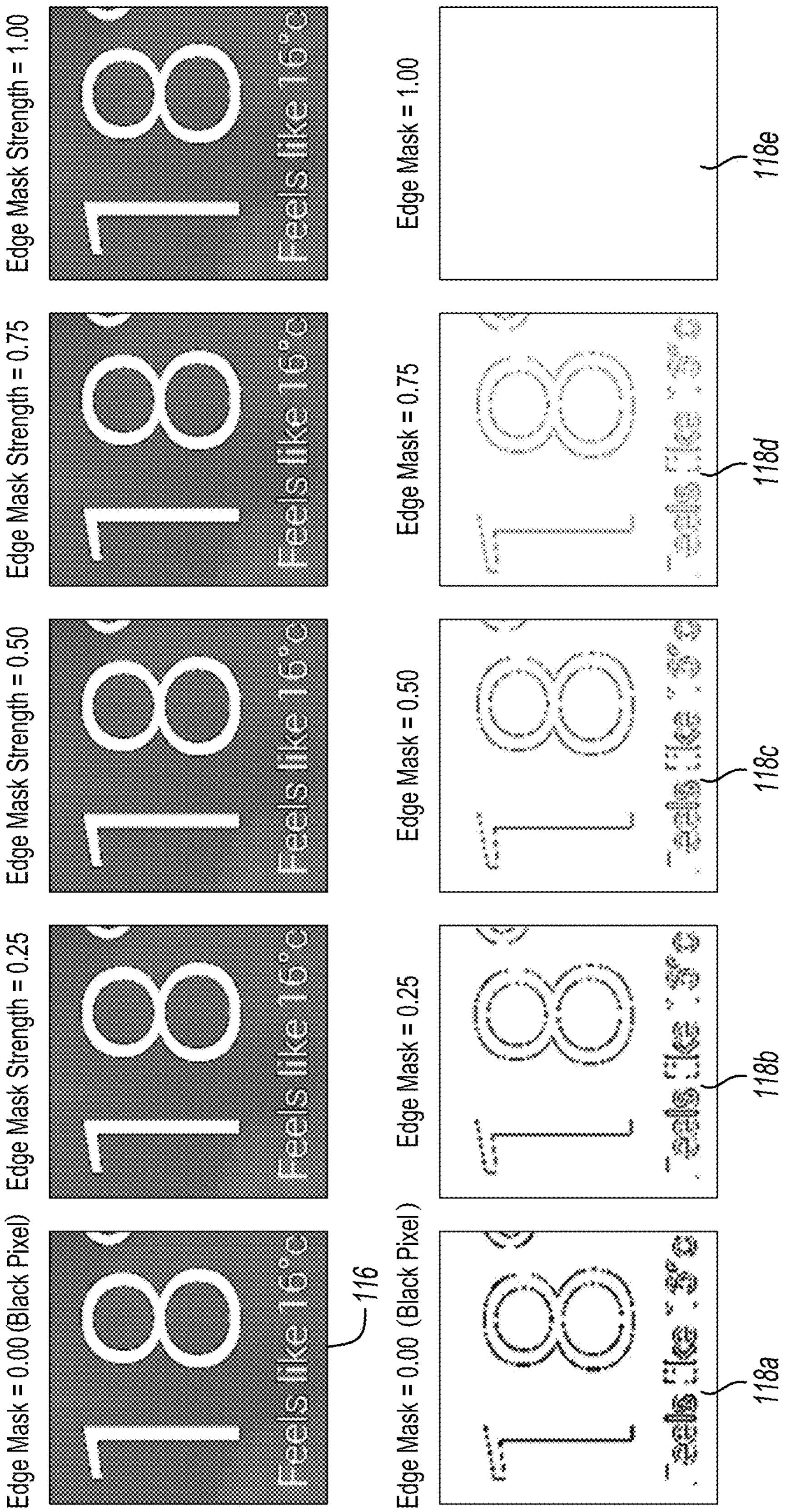
FIGS. 3A to 3E illustrate a segment of a graphics image as seen at various edge mask strength values in accordance with one or more exemplary embodiments.

FIGS. 3A to 3E illustrate an example segment of the graphics images 116 as seen at various edge mask strength values in accordance with one or more exemplary embodiments. FIG. 3A illustrates an edge mask strength value of 0.00 (e.g., dark edge pixels 118*a*). FIG. 3B illustrates an edge mask strength value of 0.25 (lighter edge pixels 118*b*). FIG. 3C illustrates an edge mask strength value of 0.50 (even lighter edge pixels 118*c*). FIG. 3D illustrates an edge mask strength value of 0.75 (exceptionally light edge pixels 118*d*). FIG. 3E illustrates an edge mask strength value of 1.00 (e.g., transparent edge pixels 118*e*).

The dynamic edge enhancement increases an effect of dark (or "black") edges as the ambient illumination increases. In various embodiments, the black edges are other than simply RGB=0. An edge mask may be adjusted by a variable multiplier ranging from 0 to 1 (e.g. 0.25). A value of 0.00 would results in current edge finding techniques and a value of 1.00 would essentially disable the edge process (RGB×1.0=RGB, no change to the background). Anything in between would vary the strength of the edge. An item to note is that the intermediate strengths of the edge pixels are not black, but rather are lower value levels of the original background colors neighboring the edges.

Figure 4:
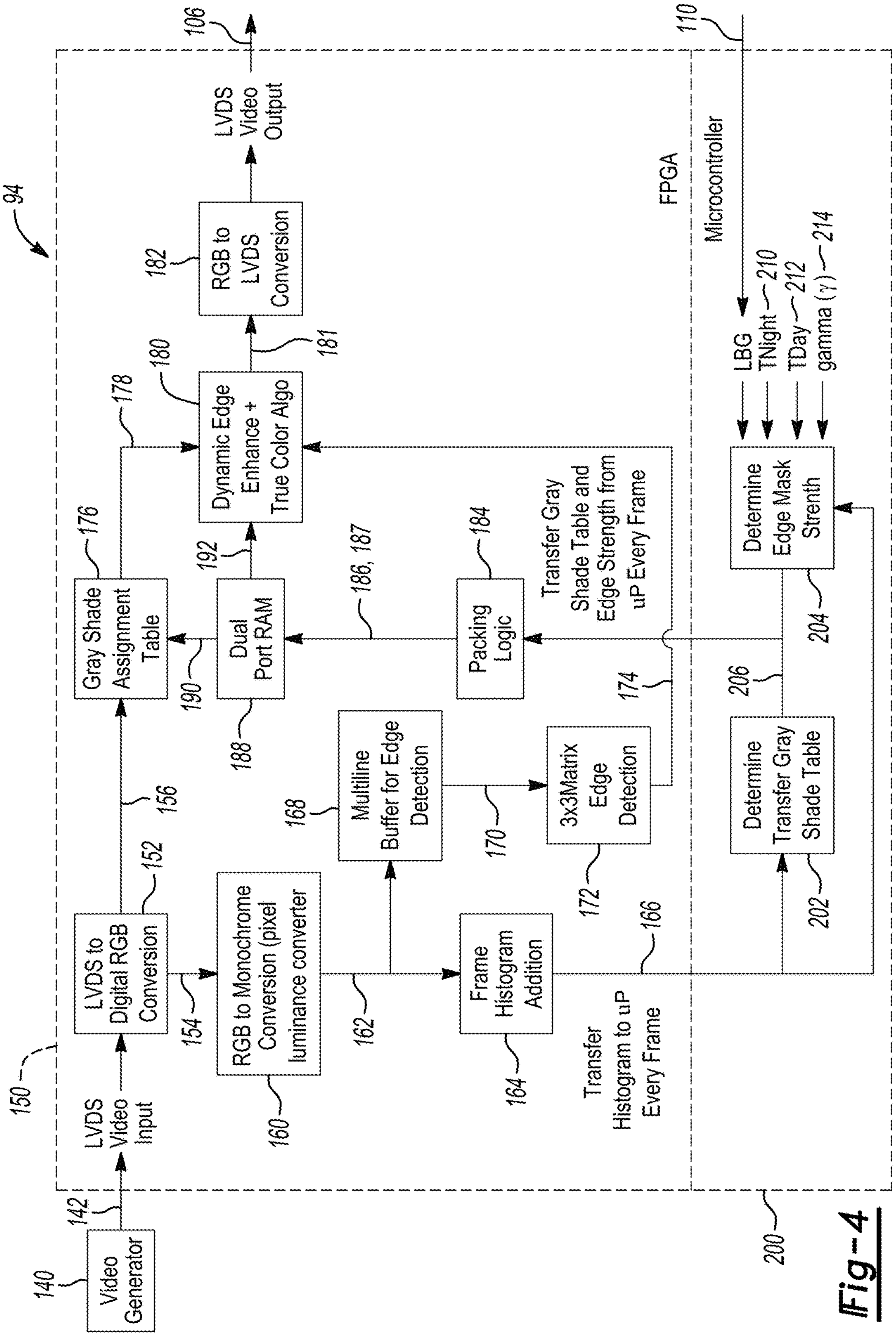
FIG. 4 illustrates a schematic functional block diagram of an electronic control unit in accordance with one or more exemplary embodiments.

FIG. 4 illustrates a schematic functional block diagram of an example implementation of the electronic control unit 94 in accordance with one or more exemplary embodiments. The electronic control unit 94 generally includes a video generator 140, a circuit 150, and a microcontroller 200. The video generator 140 creates and presents an input video signal 142 to the circuit 150. The circuit 150 generates and transfers a frame histogram to the microcontroller 200. A package signal 206 is generated by the microcontroller 200 and received by the circuit 150. The circuit 150 generates and presents the output video signal 106 to the display 100*x*.

The circuit 150 includes a first conversion circuit 152, a second conversion circuit 160, a frame histogram circuit 164, a multiline buffer circuit 168, an edge detection circuit 172, a gray shade assignment circuit 176, a dynamic edge enhancement circuit 180, a third conversion circuit 182, a packing logic circuit 184, and a dual-port random access memory (RAM) circuit 188.

The microcontroller 200 includes a gray shade transfer circuit 202 and an edge mask strength circuit 204. The gray shade transfer circuit 202 and the edge mask strength circuit 204 together create a package signal 206. The package signal 206 is presented to the packing logic circuit 184. The edge mask strength circuit 204 also receives the light background signal 110 and multiple parameters (e.g., a night luminance threshold value, a day luminance threshold value, and a gamma value).

An RGB video signal 154 is generated from the input video signal 142 by the first conversion circuit 152 (e.g., LVDS to RGB conversion) and transferred to the second conversion circuit 160. A video signal 156 is generated from the input video signal 142 by the first conversion circuit 152 and transferred to the gray shade assignment circuit 176. A luminance video signal 162 is generated from the RGB video signal 154 by the second conversion circuit 160 and transferred to both the frame histogram circuit 164 and the multiline buffer circuit 168. The frame histogram circuit 164 transfers the frame histogram in a luminance transfer histogram signal 166 to both the gray shade transfer circuit 202 and the edge mask strength circuit 204.

The multiline buffer circuit 168 generates a buffered signal 170 that is received by the edge detection circuit 172. An edge detected signal 174 is generated by the edge detection circuit 172 and transferred to the dynamic edge enhancement circuit 180. The gray shade assignment circuit 176 generates a gray shade assignment table signal 178 that is presented to the dynamic edge enhancement circuit 180. A package signal 206 is transferred from a combination of the gray shade transfer circuit 202 and the edge mask strength circuit 204 to the packing logic circuit 184. The packing logic circuit 184 transfers a gray shade transfer signal 186 and an edge mask strength signal 187 to the dual-port RAM circuit 188. A buffered gray shade transfer signal 190 is sent from the dual-port RAM circuit 188 to the gray shade assignment circuit 176. A buffered edge mask strength signal 192 is transferred from the dual-port RAM circuit 188 to the dynamic edge enhancement circuit 180. The dynamic edge enhancement circuit 180 performs edge enhancement and true color corrections to produce an enhanced video signal 181. The enhanced video signal 181 is transferred to the third conversion circuit 182. The third conversion circuit 182 converts the video (e.g., RGB to LVDS conversion) to create the output video signal 106.

The video generator 140 implements a graphics processor. The video generator 140 is operational to generate the input video signal 142. The input video signal 142 generally conveys the graphics images to be presented from the display 100*x*.

The circuit 150 implements an edge detection and a dynamic edge enhancement circuit. In various embodiments, the circuit 150 may be implemented as a field programmable gate array (FPGA). The circuit 150 is operational to generate a gray shade histogram of the frames in the input video signal 142, buffer multiple lines of the frames, detect edges in the frames, and dynamically enhance the detected edges, and present the dynamically enhanced frames (e.g., graphical image) in the output video signal 106.

The microcontroller 200 implements one or more processor circuits. The microcontroller 200 is operational to generate a gray shade transfer table and a corresponding edge mask strength value. The gray shade transfer table and the edge mask strength value are bundled in the package signal 206 and transferred to the circuit 150. In various embodiments, the package signal may be an 8-bit (0-255) value as a function of the light background signal 110, a night luminance threshold value 210, a day luminance threshold value 212, and a gamma value 214.

There are two parts to the example implementation of the dynamic edge enhancement system. First, the edge mask strength(s) is determined with respect to the background luminance (LBG) using the microcontroller 200. To do so, the equation 1 is implemented in the edge mask strength circuit 204, as shown in FIG. 4. In various embodiments, $T_{Night}$, $T_{Day}$, and gamma (γ) are respectively fixed at 30, 530, and 2.2, and may be manually adjustable with a graphic user interface feature. Other values may be implemented to meet the design criteria of a particular application. Once the edge mask strength is determined, the edge mask strength is put into the 2nd byte of a 517-byte package to send to the circuit 150, along with the control signals, frame counter, and transfer functions.

The circuit 150 receives the edge mask strength in the packing logic circuit 184 and parses out the edge mask strength signal 187. The edge enhancement is now ready to be performed in the dynamic edge enhancement circuit 180. The dynamic edge enhancement technique involves two cases to consider: edge pixels and non-edge pixels. For an edge pixel, with the edge enhancement on, the RGB subpixels may be multiplied by the edge mask strength value and divided by 256 (the division is done for scaling the RGB subpixel values by 0~1). When the edge enhancement is turned off, scaling is not performed and normal RGB subpixels are assigned.

Figure 5:
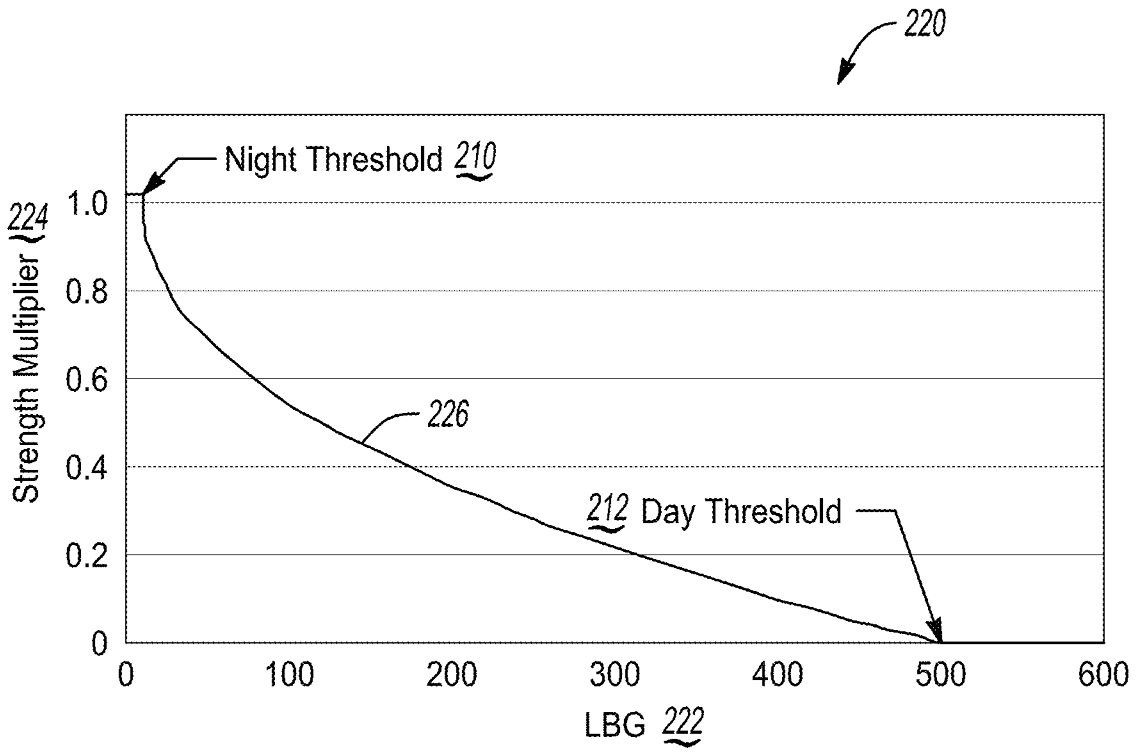
FIG. 5 illustrates a graph of a transfer function of the edge mask strength value as a function of the ambient luminance value.

FIG. 5 illustrates a graph 220 of an example transfer function of the edge mask strength value as a function of the ambient luminance value. The graph 220 has an x-axis 222 and a y-axis 224. The x-axis 222 may be in units of the ambient luminance value. The y-axis 224 may be in units of the edge mask strength value. A curve 226 illustrates and example transfer function. A relationship between the edge mask strength value and the light background signal 110 generally has the following attributes.

The night luminance threshold value 210 (e.g., TNight) establishes a lower threshold below which no masks are visible (e.g., edge mask strength value=1.00)

The day luminance threshold value 212 (e.g., Tday) establishes an upper threshold above which the edge masks are dark (e.g., edge mask strength value=0).

The transfer function curve 226 rapidly decreases from a nighttime strength of 1.00 (e.g., transparent edges) to a daytime strength of 0.00 (e.g., black edges) and reduces a negative slope of the transfer function curve 226 as the day luminance threshold value 212 is approached. A basic formula for the strength determination function(s) is provided per equation 1 as follows:

$$s = 255\left[1 - \left(\frac{LBG - T_{Night}}{T_{Day} - T_{Night}}\right)^{\left(\frac{1}{\gamma a}\right)}\right] \quad \text{Eq. (1)}$$

Where γa is a first gamma value 214.

The dynamic edge enhancement may preserve the color of the background into the edges. By multiplying the red, green, and blue gray shade values by the same "strength" value, the color may be preserved, except for the lowest gray shades where rounded values may appear. However, since the lowest gray shades are near black, the rounding may not be consequential. The multiplication for the 'strength" may be done before or after color correction. The luminance of each RGB subpixel is shown by Equations 2-4 as follows:

$$L_R = L_{RMax}\left(\frac{GS_R}{GS_{Max}}\right)^{\gamma b} \quad \text{Eq. (2)}$$

$$L_G = L_{GMax}\left(\frac{GS_G}{GS_{Max}}\right)^{\gamma b} \quad \text{Eq. (3)}$$

$$L_B = L_{BMax}\left(\frac{GS_B}{GS_{Max}}\right)^{\gamma b} \quad \text{Eq. (4)}$$

Where "L" stands for luminance, "GS" stands for gray shade and γb is a second gamma value. In various embodiments, the value used for γa may be different than the value used for γb. In some embodiments, the value used for γa may be the same as the value used for γb.

If each of the gray shades are multiplied by a strength value "s", then equations 2-4 are transformed into equations 5-7 as follows:

$$L_R = L_{RMax}\left(\frac{s \times GS_R}{GS_{Max}}\right)^{\gamma b} \quad \text{Eq. (5)}$$

$$L_G = L_{GMax}\left(\frac{s \times GS_G}{GS_{Max}}\right)^{\gamma b} \quad \text{Eq. (6)}$$

$$L_B = L_{BMax}\left(\frac{s \times GS_B}{GS_{Max}}\right)^{\gamma b} \quad \text{Eq. (7)}$$

Color is generally dependent on luminance ratios and therefore if a secondary color is a mixture of two other colors (e.g., red and green), the luminance ratio, R, may be determined according to equation 8 as follows:

$$R = \frac{L_R}{L_G} = \frac{L_{RMax}\left(\frac{s \times GS_R}{GS_{Max}}\right)^{\gamma b}}{L_{GMax}\left(\frac{s \times GS_G}{GS_{Max}}\right)^{\gamma b}} = \frac{L_{RMax}(GS_R)^{\gamma b}}{L_{GMax}(GS_G)^{\gamma b}} = \frac{L_{RMax}}{L_{GMax}}\left(\frac{GS_R}{GS_G}\right)^{\gamma b} \quad \text{Eq. (8)}$$

Note that the same result may be obtained if equation 2 was divided by equation 3 thus proving that the color coordinates will be maintained. In various implementations, the "strength" multiplication may be applied after the image enhancement.

Figure 6:
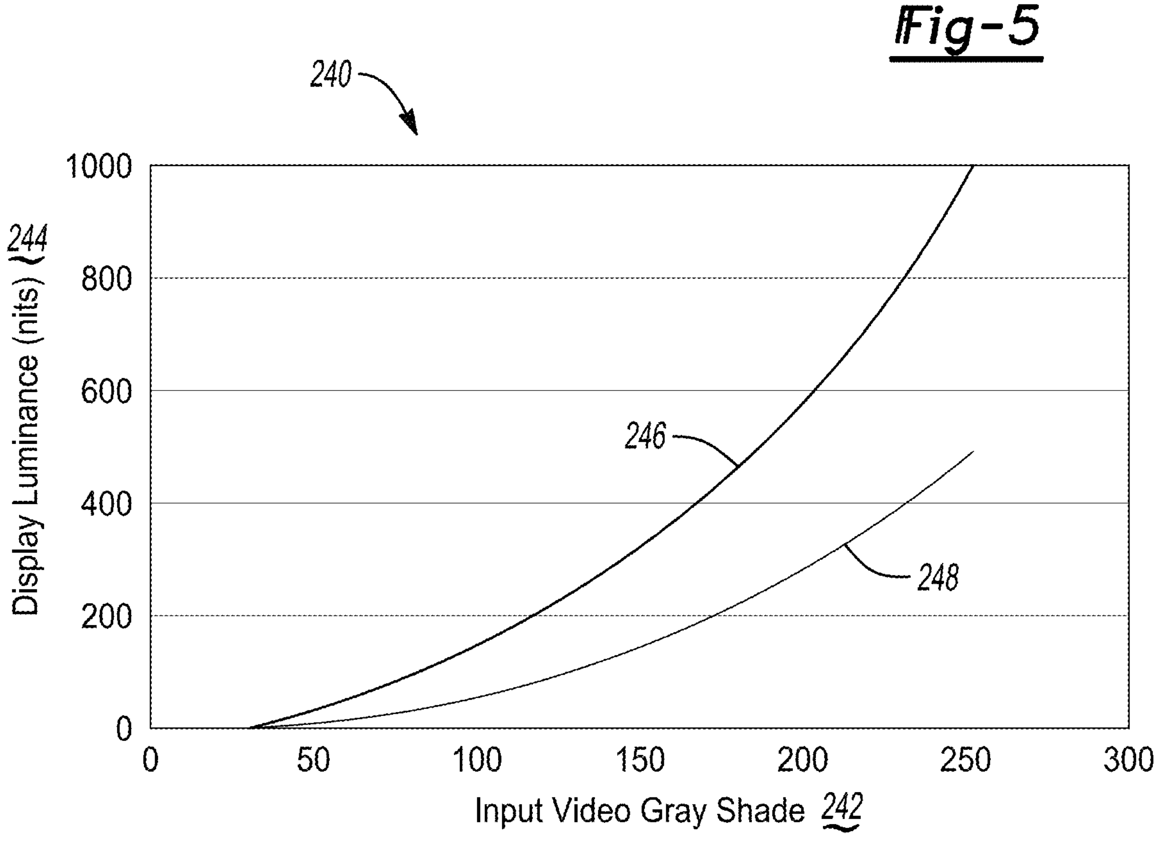
FIG. 6 illustrates a graph of display luminance as a function of input gray shades in accordance with one or more exemplary embodiments.

FIG. 6 illustrates a graph 240 of an example display luminance as a function of input gray shades in accordance with one or more exemplary embodiments. The graph 240 has a first axis 242 and a second axis 244. The first axis 242 generally illustrates the input gray shades available in the input video signal 142. The second axis 244 illustrates the display luminance in units of nits. A nit may be a measure of a candela per square meter (cd/m$^2$).

A curve 246 shows a display gamma at 1000 nits. For bright (or high) gray shades (e.g., >approximately 200 out of 255 maximum for 8-bit images), the display luminance may range from approximately 600 nits at a gray shade of 200, to approximately 1000 nits at the maximum gray shade of 255. For dark (or low) gray shades (e.g., <approximately 50), the display luminance changes little with changes in gray shades and remains near zero nits.

A curve 248 shows a display gamma at 500 nits. For bright (or high) gray shades (e.g., >approximately 200 out of 255 maximum), the display luminance may range from approximately 300 nits at a gray shade of 200, to approximately 500 nits at the gray shade of 255. For dark (or low) gray shades (e.g., <approximately 50), the display luminance changes little with changes in gray shades and remains near zero nits. Other ranges of gray shades and/or other subdivisions of the ranges into bright, intermediate, and dark may be implemented to meet the design criteria of a particular application.

An issue with the automatic luminance control is that the dark gray shades are less visible under a variety of ambient lighting conditions. Merely increasing the display luminance does little for dark gray shade visibility primarily due to the nature of the gamma function (γ) used in the displays **100*a*-100*c*** per equation 9 as follows:

$$L_{GrayShade} = L_{max}(GS / GS_{max})^{\gamma} \quad \text{Eq. (9)}$$

Where GS is a particular gray shade, GSmax is a maximum gray shade of the image received by the display, $L_{max}$ is a maximum luminance of the display, γ is a gamma function of the display **100*x***, and $L_{GrayShade}$ is a display luminance at the particular gray shade GS.

Many automotive images have most of the pixels at the dark gray shades (e.g., GS<approximately 50) and the intermediate gray shades (e.g., approximately 51<GS<approximately 200), and a few pixels with higher (bright) gray shade content (e.g., GS>approximately 200). Therefore, in order to have good visibility of the dark gray shades and the intermediate gray shades, the dark gray shade levels and the intermediate gray shade levels are dynamically adjusted upward to higher gray shade levels as a function of ambient lighting conditions. The dynamic adjustment is referred to as a dynamic image enhancement (DIA). The dynamic image enhancement may be accomplished by measuring the current lighting condition and dynamically adjusting the image content for image visibility. Where the dynamic image enhancement is combined with the automatic luminance control, the display image may remain visible under a variety of lighting conditions, and a peak white luminance may be adjusted for comfortable viewing. Limiting the peak white luminance affords a benefit of reduced display power dissipation.

Figure 7:
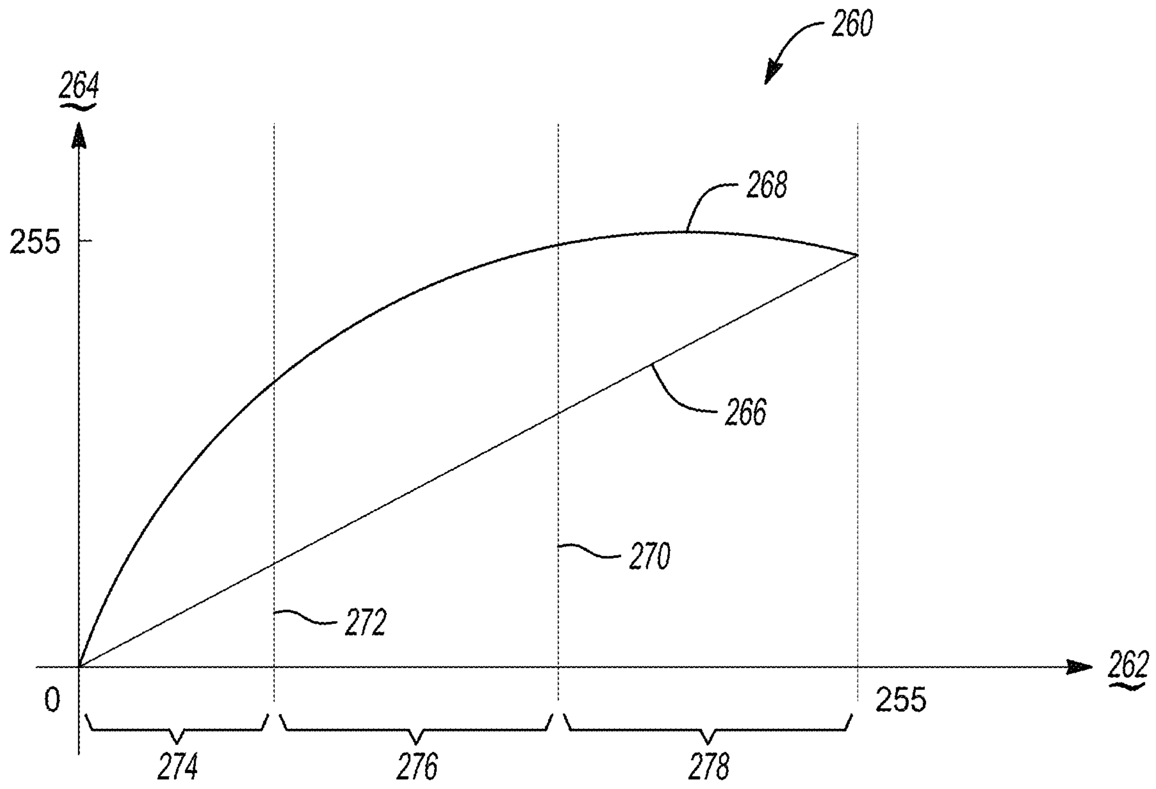
FIG. 7 illustrates a graph of gray shade enhancement in accordance with one or more exemplary embodiments.

FIG. 7 illustrates a graph 260 of an example enhancement of gray shades in accordance with one or more exemplary embodiments. The graph 260 has a first axis 262 and a second axis 264. The first axis 262 generally illustrates the input gray shades available in the input video signal 142. The input gray shades in the example have a range of 0 to 255. The second axis 264 illustrates the output gray shade available in the output video signal 106. The output gray shades in the example also have the range of 0 to 255. Other ranges of the shades of gray (e.g., 0 to 1023 for 10-bit images) may be implemented to meet the design criteria of a particular application.

A curve 266 (e.g., a straight line) shows a non-enhanced transfer of the gray shades from the input video signal 142 to the output video signal 106. Each gray shade in the output video signal 106 matches a corresponding gray shade in the input video signal 142. In a typical automotive application, a small percentage (e.g., <5 percent) of the images in the input video signal 142 will have gray shade content to the right (e.g., brighter) than the line 270 in the bright shade region 278. The majority of the gray shade content is generally in the dark shade region 274 between the zero gray shade and the line 272, and in the intermediate shade region 276 between the line 270 and the line 272.

A curve 268 shows an enhanced transfer of the gray shade form the input video signal 142 to the output video signal 106. The enhancement may increase the output gray shades in the dark shade region 274 and the intermediate shade region 276, while maintaining the bright shade region 278 with little to no change. As a result, the dark gray shades and the intermediate gray shades are brighter on the display 100*x* and so are more easily seen by the driver 98 under brighter lighting conditions.

Figure 8:
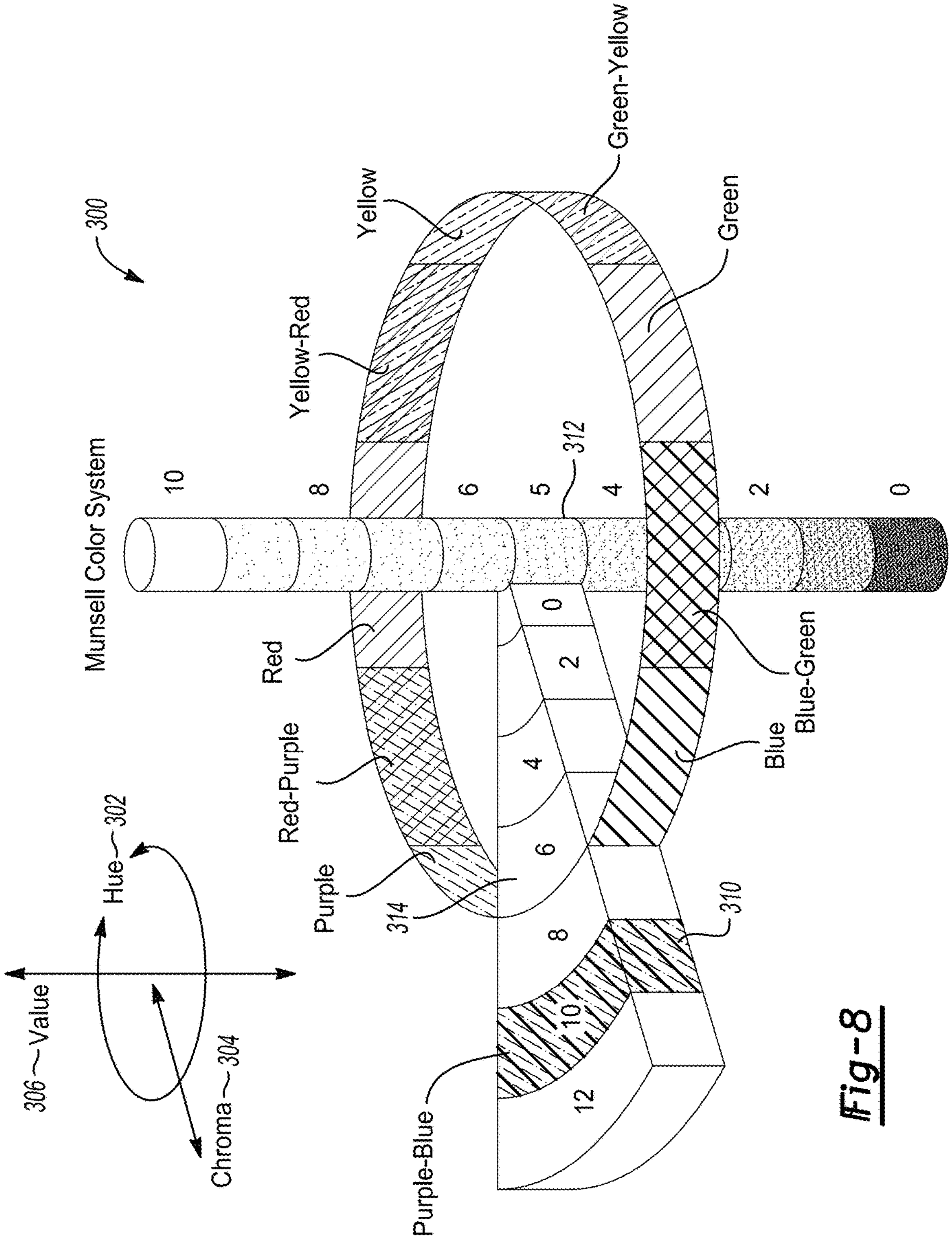
FIG. 8 illustrates a schematic diagram of a Munsell color system in accordance with an exemplary embodiment.

FIG. 8 illustrates a schematic diagram of an example Munsell color system 300 in accordance with an exemplary embodiment. The Munsell color system 300 defines a color space in terms of a hue 302 (or color), a chroma 304 (or purity), and a value 306 (or color intensity). When applied to an edge under low ambient light conditions, the edge may be extinguished by adjusting the value 306 of the edge pixels to match a local background color. For example, if the local background color has a hue 302 of purple-blue 310, a value of five (cylinder 312), and a chroma 304 value of six (wedge 314), the edge pixels may be adjusted to the same purple-blue, value of five and chroma of six. When applied to an edge under high ambient conditions, the edge pixels may be darkened by reducing the value 306 of the edge pixels.

Embodiments of the disclosure generally provide a dynamic edge detection system and/or method that dynamically enhances symbology edges as a function of the ambient lighting condition. Under nighttime lighting conditions, edge enhancement is not advantageous since image artifacts are introduced that are not helpful for image visibility. As the reflected ambient lighting conditions increase, it is helpful to increase the visibility of dark borders around symbology.

Those having ordinary skill in the art will recognize that terms such as “above,” “below,” “front,” “back,” “upward,” “downward,” “top,” “bottom,” etc., may be used descriptively herein without representing limitations on the scope of the disclosure. Furthermore, the present teachings may be described in terms of functional and/or logical block components and/or various processing steps. Such block components may be comprised of various hardware components, software components executing on hardware, and/or firmware components executing on hardware.

The foregoing detailed description and the drawings are supportive and descriptive of the disclosure, but the scope of the disclosure is defined solely by the claims. As will be appreciated by those of ordinary skill in the art, various alternative designs and embodiments may exist for practicing the disclosure defined in the appended claims.

The invention claimed is:

1. A dynamic edge enhancement system comprising:
- a light sensor operational to generate a light background signal by measuring an ambient light falling on a display;
- a circuit operational to:
  - generate a histogram of gray shade values in a plurality of frames of an input video signal received by the circuit;
  - detect a plurality of edges in the input video signal;
  - enhance the plurality of edges in response to a gray shade transfer table and an edge mask strength value; and
  - generate an output video signal suitable to drive the display after the enhancement of the plurality of edges; and
- a microcontroller operational to:
  - generate the gray shade transfer table based on the histogram generated by the circuit; and
  - generate the edge mask strength value in response to the gray shade transfer table, the light background signal, a night luminance threshold value, and a day luminance threshold value.

2. The dynamic edge enhancement system according to claim 1, wherein:
- the enhancement of the plurality of edges by the circuit extinguishes the plurality of edges in response to receiving a no-mask value of the edge mask strength value.

3. The dynamic edge enhancement system according to claim 2, wherein:
- the microcontroller is further operational to set the edge mask strength value to the no-mask value in response to the light background signal being dimmer than the night luminance threshold value.

4. The dynamic edge enhancement system according to claim 2, wherein:
- the enhancement of the plurality of edges by the circuit darkens the plurality of edges in response to receiving a full-mask value of the edge mask strength value.

5. The dynamic edge enhancement system according to claim 4, wherein:
- the microcontroller is further operational to set the edge mask strength value to the full-mask value in response to the light background signal being brighter than the day luminance threshold value.

6. The dynamic edge enhancement system according to claim 4, wherein:
- the plurality of edges that are extinguished in response to the no-mask value approximately match a local background color in the input video signal;
- the plurality of edges that are darkened in response to the full-mask value approximately match a zero-value version of the local background color in a Munsell color system; and
- the plurality of edges are adjusted to a value level between the local background color and the zero-value version of the local background color where the edge mask strength value is between the no-mask value and the full-mask value.

7. The dynamic edge enhancement system according to claim 4, wherein:

a negative slope of a transfer function curve of the edge mask strength value as the light background signal varies between the night luminance threshold value and the day luminance threshold value is reduced as the transfer function curve approaches the day luminance threshold value.

8. The dynamic edge enhancement system according to claim 1, wherein:

the plurality of edges are detected where a contrast ratio is greater than an edge threshold value.

9. The dynamic edge enhancement system according to claim 1, wherein the display forms part of a vehicle.

10. A method for dynamic edge enhancement comprising:

generating a light background signal by measuring an ambient light falling on a display with a light sensor;

generating a histogram of gray shade values in a plurality of frames of an input video signal received at a circuit;

generating a gray shade transfer table based on the histogram;

generating an edge mask strength value with a microcontroller in response to the gray shade transfer table, the light background signal, a night luminance threshold value, and a day luminance threshold value;

detecting a plurality of edges in the input video signal;

enhancing the plurality of edges in the input video signal in response to the gray shade transfer table and the edge mask strength value; and generating an output video signal suitable to drive the display after the enhancement of the plurality of edges.

11. The method according to claim 10, wherein:

the enhancing of the plurality of edges extinguishes the plurality of edges in response to receiving a no-mask value of the edge mask strength value.

12. The method according to claim 11, further comprising:

setting the edge mask strength value to the no-mask value in response to the light background signal being dimmer than the night luminance threshold value.

13. The method according to claim 11, wherein:

the enhancing of the plurality of edges darkens the plurality of edges in response to receiving a full-mask value of the edge mask strength value.

14. The method according to claim 13, further comprising:

setting the edge mask strength value to the full-mask value in response to the light background signal being brighter than the day luminance threshold value.

15. The method according to claim 13, wherein:

the plurality of edges that are extinguished in response to the no-mask value approximately match a local background color in the input video signal;

the plurality of edges that are darkened in response to the full-mask value approximately match a zero-value version of the local background color in a Munsell color system; and the plurality of edges are adjusted to a value level between the local background color and the zero-value version of the local background color where the edge mask strength value is between the no-mask value and the full-mask value.

16. The method according to claim 13, wherein:

a negative slope of a transfer function curve of the edge mask strength value as the light background signal varies between the night luminance threshold value and the day luminance threshold value is reduced as the transfer function curve approaches the day luminance threshold value.

17. The method according to claim 10, wherein:

the plurality of edges are detected where a contrast ratio is greater than an edge threshold value.

18. The method according to claim 10, wherein the enhancing of the plurality of edges in the input video signal is performed in a vehicle.

19. A vehicle comprising:

a display;

a light sensor operational to generate a light background signal by measuring an ambient light falling on the display; and an electronic control unit operational to:

generate a histogram of gray shade values in a plurality of frames of an input video signal received by the electronic control unit;

generate a gray shade transfer table based on the histogram;

generate an edge mask strength value in response to the gray shade transfer table, the light background signal, a night luminance threshold value, and a day luminance threshold value;

detect a plurality of edges in the input video signal;

enhance the plurality of edges in response to the gray shade transfer table and the edge mask strength value; and generate an output video signal used to drive the display after the enhancement of the plurality of edges.

20. The vehicle according to claim 19, wherein:

the plurality of edges that are extinguished in response to a no-mask value of the edge mask strength value approximately match a local background color in the input video signal;

the plurality of edges that are darkened in response to a full-mask value of the edge mask strength value approximately match a zero-value version of the local background color in a Munsell color system; and the plurality of edges are adjusted to a value level between the local background color and the zero-value version of the local background color where the edge mask strength value is between the no-mask value and the full-mask value.

* * * * *